(12) United States Patent
Klopsch et al.

(10) Patent No.: US 8,218,170 B2
(45) Date of Patent: Jul. 10, 2012

(54) MULTI-PRINT STREAM PROCESSING MODULE OPTIMIZER FOR DOCUMENT PROCESSING

(75) Inventors: Karl F. Klopsch, Fair Oaks, CA (US); Uwe Meister, Elk Grove, CA (US)

(73) Assignee: Bell and Howell, LLC, Durham, NC (US)

( * ) Notice: Subject to any disclaimer, the term of this patent is extended or adjusted under 35 U.S.C. 154(b) by 1349 days.

(21) Appl. No.: 11/217,458

(22) Filed: Sep. 2, 2005

(65) Prior Publication Data

US 2006/0080122 A1 Apr. 13, 2006

Related U.S. Application Data

(60) Provisional application No. 60/616,625, filed on Oct. 8, 2004.

(51) Int. Cl.
*G06F 3/12* (2006.01)
*G06F 17/00* (2006.01)

(52) U.S. Cl. ....... 358/1.15; 358/1.18; 358/1.9; 705/408; 705/401; 705/402; 705/406; 53/460

(58) Field of Classification Search ............. 358/1.1–1.9
See application file for complete search history.

(56) References Cited

U.S. PATENT DOCUMENTS

| | | | |
|---|---|---|---|
| 5,528,734 A | 6/1996 | Sanchez | |
| 5,644,682 A | 7/1997 | Weinberger et al. | |
| 5,669,040 A | 9/1997 | Hisatake | |
| 5,684,706 A * | 11/1997 | Harman et al. | 700/95 |
| 6,481,711 B1 | 11/2002 | Pickett | |
| 6,493,098 B1 * | 12/2002 | Cornell | 358/1.12 |
| 6,549,299 B1 * | 4/2003 | Allen et al. | 358/1.18 |
| 6,624,908 B1 | 9/2003 | Petchenkine et al. | |
| 6,707,574 B1 | 3/2004 | Freeman et al. | |
| 6,970,261 B1 * | 11/2005 | Robles | 358/1.15 |
| 6,985,245 B1 * | 1/2006 | Takahashi | 358/1.15 |
| 7,099,027 B1 * | 8/2006 | Barry et al. | 358/1.15 |
| 7,206,087 B2 * | 4/2007 | Ryan et al. | 358/1.15 |
| 2002/0097407 A1 * | 7/2002 | Ryan et al. | 358/1.1 |

(Continued)

FOREIGN PATENT DOCUMENTS

GB 2 368 954 A 5/2002

OTHER PUBLICATIONS

European Search Report issued in European Patent Application No. EP 06017921.5 dated May 11, 2009.
United States Office Action issued in U.S. Appl. No. 11/357,083, mailed Mar. 25, 2010.

(Continued)

*Primary Examiner* — Marivelisse Santiago Cordero
*Assistant Examiner* — Huo Long Chen
(74) *Attorney, Agent, or Firm* — McDermott Will & Emery LLP (57) ABSTRACT

Multiple print streams destined for individual print stream processing modules are optimized prior to printing. The process of optimizing includes receiving an input representing a plurality of documents to be printed and determining an attribute of each document of the plurality of documents represented by the input. The attribute relates to processing of the respective document through the document processing system. Optimization involves balancing an operation time of a first print stream processing module with an operation time of a second print stream processing module, by assigning each document to one of the print stream processing modules based on its determined attribute.

14 Claims, 7 Drawing Sheets

U.S. PATENT DOCUMENTS

2002/0129081 A1 9/2002 Rai et al.
2002/0186384 A1 12/2002 Winston et al.
2003/0084068 A1* 5/2003 Harman ........................ 707/200
2003/0218775 A1 11/2003 Udo et al.
2004/0036902 A1 2/2004 Ducato
2004/0114170 A1 6/2004 Christiansen et al.
2005/0275875 A1* 12/2005 Jennings, Jr. ................ 358/1.15

OTHER PUBLICATIONS

United States Office Action issued in U.S. Appl. No. 11/357,083, mailed Aug. 31, 2010.
Extended European Search Report issued in related European Patent Application No. 05020581.4-1245 dated Apr. 24, 2009.

* cited by examiner

| Single Channel | | | | |
|---|---|---|---|---|
| Piece # | Pages | Time to assemble Package | Time line to present package to inserter (ms) | Max Speed |
| 1 | 1 | 200 | 200 | 18,000 |
| 2 | 3 | 333 | 533 | 10,800 |
| 3 | 5 | 529 | 1062 | 6,800 |
| 4 | 2 | 255 | 1317 | 14,100 |
| 5 | 2 | 255 | 1572 | 14,100 |
| 6 | 1 | 200 | 1772 | 18,000 |
| 7 | 3 | 333 | 2105 | 10,800 |
| 8 | 4 | 433 | 2538 | 8,300 |
| 9 | 4 | 433 | 2971 | 8,300 |
| 10 | 5 | 529 | 3500 | 6,800 |
| 11 | 1 | 200 | 3700 | 18,000 |
| 12 | 2 | 255 | 3955 | 14,100 |
| 13 | 3 | 333 | 4288 | 10,800 |
| 14 | 4 | 433 | 4721 | 8,300 |
| 15 | 2 | 255 | 4976 | 14,100 |
| 16 | 2 | 255 | 5231 | 14,100 |
| 17 | 1 | 200 | 5431 | 18,000 |
| 18 | 4 | 433 | 5864 | 8,300 |
| 19 | 5 | 529 | 6393 | 6,800 |
| 20 | 4 | 433 | 6826 | 8,300 |
| Average | | | | 11,840 |

Fig. 7

| | Dual Channel | | | | | | | |
|---|---|---|---|---|---|---|---|---|
| | Piece # | Pages | Channel 1 feeding | Time to assemble Package | Channel 2 feeding | Time to assemble Package | Time line to present package to inserter | Max Speed |
| | 1 | 1 | x | 200 | | | 200 | 18,000 |
| | 2 | 3 | | | x | 333 | 400 | 18,000 |
| | 3 | 5 | x | 529 | | | 600 | 18,000 |
| | 4 | 2 | | | x | 255 | 800 | 18,000 |
| | 5 | 2 | | | x | 255 | 1055 | 14,100 |
| | 6 | 1 | | | x | 200 | 1255 | 18,000 |
| | 7 | 3 | x | 333 | | | 1455 | 18,000 |
| | 8 | 4 | | | x | 433 | 1655 | 18,000 |
| | 9 | 4 | x | 433 | | | 1855 | 18,000 |
| | 10 | 5 | | | x | 529 | 2055 | 18,000 |
| | 11 | 1 | x | | | 200 | 2255 | 18,000 |
| | 12 | 2 | x | 255 | | | 2455 | 18,000 |
| | 13 | 3 | | | x | 333 | 2655 | 18,000 |
| | 14 | 4 | x | 433 | | | 2855 | 18,000 |
| | 15 | 2 | | | x | 255 | 3055 | 18,000 |
| | 16 | 2 | | | x | 255 | 3310 | 14,100 |
| | 17 | 1 | | | x | 200 | 3510 | 18,000 |
| | 18 | 4 | x | 433 | | | 3710 | 18,000 |
| | 19 | 5 | | | x | 529 | 3910 | 18,000 |
| | 20 | 4 | x | 433 | | | 4110 | 18,000 |
| Average | | | | | | | | 17,610 |

Fig. 8

MULTI-PRINT STREAM PROCESSING MODULE OPTIMIZER FOR DOCUMENT PROCESSING

CROSS-REFERENCE TO PROVISIONAL APPLICATION

This application claims the benefit of U.S. Provisional Application No. 60/616,625 entitled "Multi-Channel Print Stream Optimizer for Document Processing" filed on Oct. 8, 2004, the disclosure of which is entirely incorporated herein by reference.

FIELD OF THE INVENTION

The subject matter presented herein relates to a method, apparatus and program product for optimizing print streams for multiple print stream modules prior to printing.

BACKGROUND

Mail processing facilities often use mail processing machines to print and insert mail into envelopes. The speed of these inserters is greatly influenced by the amount of material or number of pages per package. As the number of pages for a given package increase, overall speed per package of an inserter decreases. This is because as a larger package is assembled, components upstream from an assembly module slow down until assembly is complete. Hence, the assembly module limits the speed of the entire machine.

Moreover, mail processing facilities that print and process large amounts of mail obtain postal discounts if the mail is grouped by common destinations. Mail can either be grouped before or after printing. After-print grouping adds additional effort to the mail producing process. Alternatively, grouping software groups mail before it is ever printed, and arranges the mail in a way that accomplishes maximum postal discounts.

A need has arisen to increase the throughput of mail processing machines while maintaining postal discounts.

SUMMARY

The teachings herein alleviate one or more of the above noted problems with a method for optimizing multiple print streams prior to printing. Print streams are destined for at least a first print stream processing module and a second print stream processing module of a document processing system. The steps include receiving an input representing a plurality of documents to be printed and determining an attribute of each document of the plurality of documents represented by the input. The attribute relates to processing of the respective document through the document processing system. The optimizing technique involves balancing an operation time of the first print stream processing module with an operation time of the second print stream processing module, by assigning each document to one of the modules based on its determined attribute, and generating representations of a first print stream for the first print stream processing module and a second print stream for the second print stream processing module.

The teachings herein increase the overall efficiency of the document processing system by feeding documents to each print stream processing module in an order that increases the average speed of the collective output of the modules. The desired balance may be accomplished by feeding several small documents into one module while a larger document is being assembled in the other module. Also, the order the documents are fed into each module is determined prior to printing so that the documents are printed in the same order they will be processed. Hence, no intermediate mechanical grouping is required.

Additional objects, advantages and novel features will be set forth in part in the description which follows, and in part will become apparent to those skilled in the art upon examination of the following and the accompanying drawings or may be learned by production or operation of the examples. The objects and advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and software have been described at a relatively high-level, without detail, in order to avoid unnecessarily obscuring aspects of the present teachings.

Figure 1:
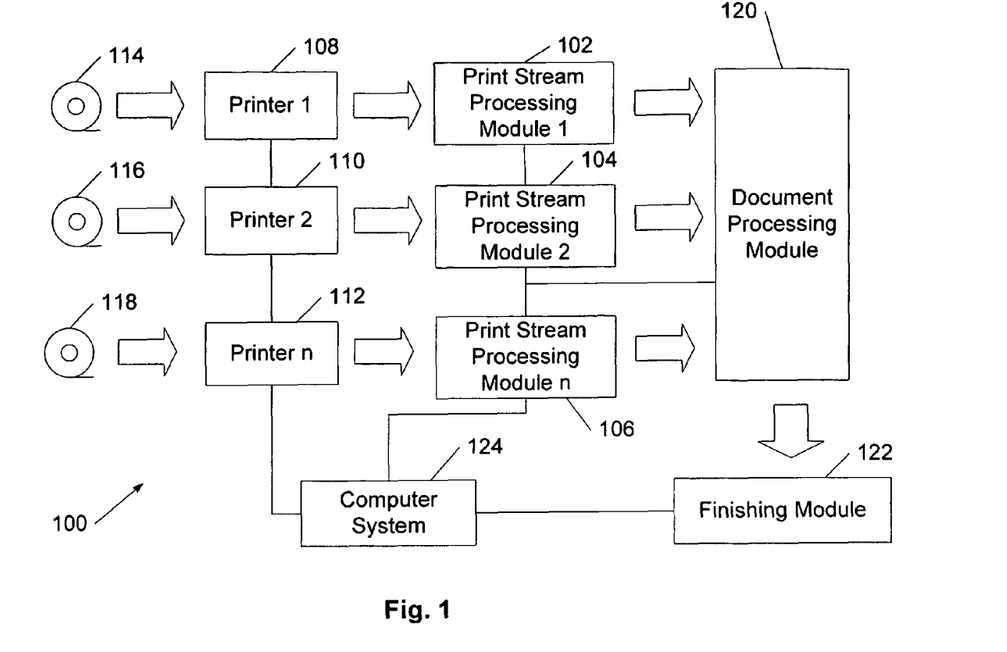
FIG. 1 depicts an exemplary high-level block diagram of a document processing system.

FIG. 1 depicts a high-level block diagram of a document processing system 100 for which throughput can be optimized utilizing the novel concepts discussed herein. Essentially, the system 100 comprises a plurality of print stream processing modules 1-$n$. The print stream processing module 1 is designated by number 102, the print stream processing module 2 is designated by 104, and the $n^{th}$ print stream processing module is designated by number 106. There may be two, three or more print stream processing modules. Each print stream processing module 102, 104, 106 may perform one or various operations such a material cutting, assembly, folding, material authentication, etc. Each are modular in the sense that each can be designed differently to perform one or various functions. The novel concepts discussed herein are not limited to the number of print stream processing modules or specific functions of each discussed herein.

Upstream from each print stream processing module 102, 104, 106 is a printer 108, 110, 112, each fed from a roll of continuous form material 114, 116, 118. However, non-continuous material (e.g., individual sheets) may be used. The printers 108, 110, 112 generate a print stream for the print stream processing modules 102, 104, 106, respectively. Each print stream processing module 102, 104, 106 is shown to receive a print stream from each printer 108, 110, 112, respectively. The manner in which the print streams are provided to the print stream processing modules are not limiting to the novel concepts herein. The print streams may be applied in an online manner, i.e., where the output of each printer fed to a respective print stream module. Alternatively, the print streams may be generated offline, and assembled in bins, which are later applied to the print stream processing modules. Moreover, a printer 108, 110, 112 may feed more than one print stream processing module 102, 104, 106. A printer 108, 110, 112 may have two outputs each outputting a print stream to two print stream processing modules 102, 104, 106.

A document processing module 120 positioned downstream from the print stream processing modules 102, 104, 106 processes the output of each print stream processing module. Exemplary processes may include a machine for inserting material, such as credit cards, personalized statements, advertisements, etc. A finishing module 122 positioned downstream from the document processing module 120 may be utilized to insert material in an envelope, sort the output mail, etc.

Each of the printers 108, 110, 112, print stream processing modules 102, 104, 106, document processing module 120 and finishing module 122 may be controlled by a computer system 124. The computer system 124 may have numerous functions, some of which include generating print files for each printer 108, 110, 112 from a job file; and controlling the operation of each print stream processing module 102, 104, 106, document processing module 120 and finishing module 122. Although shown as a single computer 124, those skilled in the art will recognize that a system 100 may use a network of controlled computers to implement the relevant data processing and/or control functions.

Figure 2:
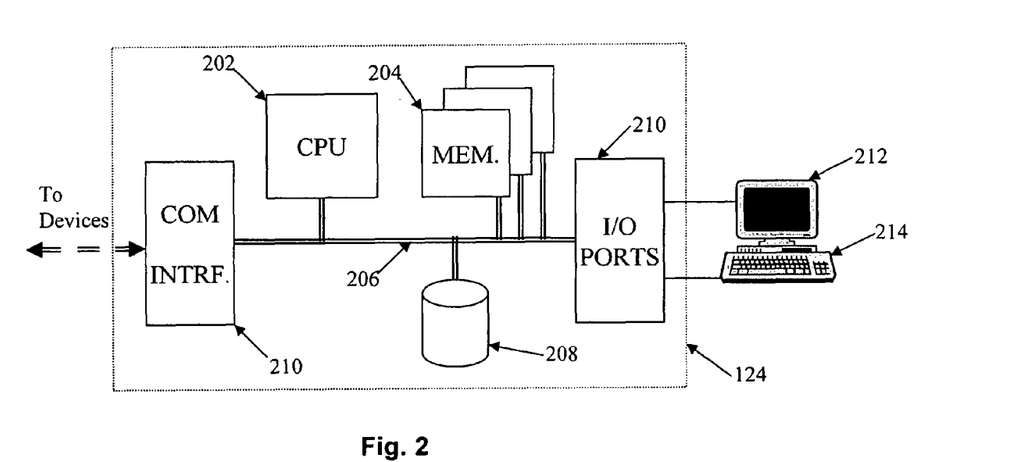
FIG. 2 depicts a general computer used in conjunction with the document process system described herein.

FIG. 2 is a functional block diagram of such a computer system 124. The computer system 124 receives print files or generates print files from a job file, develops optimized print streams, and sends print streams to printers 108-110. Based on these print streams, the computer system 124 may send Mailer USPS or other postal authority documentation to a printer (not shown) or another appropriate output device based the print streams sent to the printer.

The exemplary computer system 124 may include a central processing unit (CPU) 202, memories 204, and an interconnect bus 206. The CPU 202 may contain a single microprocessor, or may contain a plurality of microprocessors for configuring the computer system 124 as a multi-processor system. The memories 204 include a main memory, a read only memory, and mass storage devices such as various disk drives, tape drives, etc. The main memory typically includes dynamic random access memory (DRAM) and high-speed cache memory. In operation, the main memory stores at least portions of instructions for execution by the CPU 202 and data for processing in accord with the executed instructions.

The mass storage 208 may include one or more magnetic disk or tape drives or optical disk drives, for storing data and instructions for use by CPU 202. For a workstation PC, for example, at least one mass storage system 208 in the form of a disk drive or tape drive, stores the operating system and application software as well as a data file. The mass storage 208 within the computer system 124 may also include one or more drives for various portable media, such as a floppy disk, a compact disc read only memory (CD-ROM or DVD-ROM), or an integrated circuit non-volatile memory adapter (i.e. PC-MCIA adapter) to input and output data and code to and from the computer system 124.

The computer system 124 also includes one or more input/output interfaces 210 for communications, shown by way of example as an interface for data communications via a network or direct line connection. The interface may be a modem, an Ethernet card or any other appropriate data communications device. The physical communication links may be optical, wired, or wireless. The network or discrete interface may further connect to various electrical components of the document processing modules, discussed herein, to transmit instructions and receive information for control thereof. The network or discrete interface also will connect to the detector (shown in FIG. 3) to receive data associated with the printed material. The network shall include any type of communication implementation for receiving and transmitting information to and from components of the sorter and components external to the sorter.

The computer system 124 may further include appropriate input/output ports for interconnection with a display 212 and a keyboard 214 serving as the respective user interface. For example, the computer system 124 may include a graphics subsystem to drive the output display. The output display may include a cathode ray tube (CRT) display or liquid crystal display (LCD). Although not shown, the PC type system typically would include a port for connection to a printer. The input control devices for such an implementation of the system would include the keyboard for inputting alphanumeric and other key information. The input control devices for the system may further include a cursor control device (not shown), such as a mouse, a trackball, a touchpad, stylus, or cursor direction keys. The links of the peripherals to the system may be wired connections or use wireless communications.

The computer system 124 shown and discussed is an example of a platform supporting processing and control functions of the document processing system described herein. The optimizing functions and the computer processing operations discussed herein may reside on a single computer system, or two separate systems; or one or both of these functions may be distributed across a number of computers.

The software functionalities of the computer system 124 involve programming, including executable code as well as associated stored data. Software code is executable by the general-purpose computer 124 that functions as an inserter controller. In operation, the code and possibly the associated data records are stored within the general-purpose computer platform 124. At other times, however, the software may be stored at other locations and/or transported for loading into the appropriate general-purpose computer system. Hence, the embodiments involve one or more software products in the form of one or more modules of code carried by at least one machine-readable. Execution of such code by a processor of the computer platform enables the platform to implement the catalog and/or software downloading functions, in essentially the manner performed in the embodiments discussed and illustrated herein.

As used herein, terms such as computer or machine "readable medium" refer to any medium bearing the code or instruction that may participate in providing instructions to a processor for execution. Such a medium may take many forms, including but not limited to, non-volatile media, volatile media, and transmission media. Non-volatile media include, for example, optical or magnetic disks, such as any of the storage devices in any computer(s) operating as one of the server platform, discussed above. Volatile media include dynamic memory, such as main memory of such a computer platform. Physical transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include, for example: a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Figure 3:
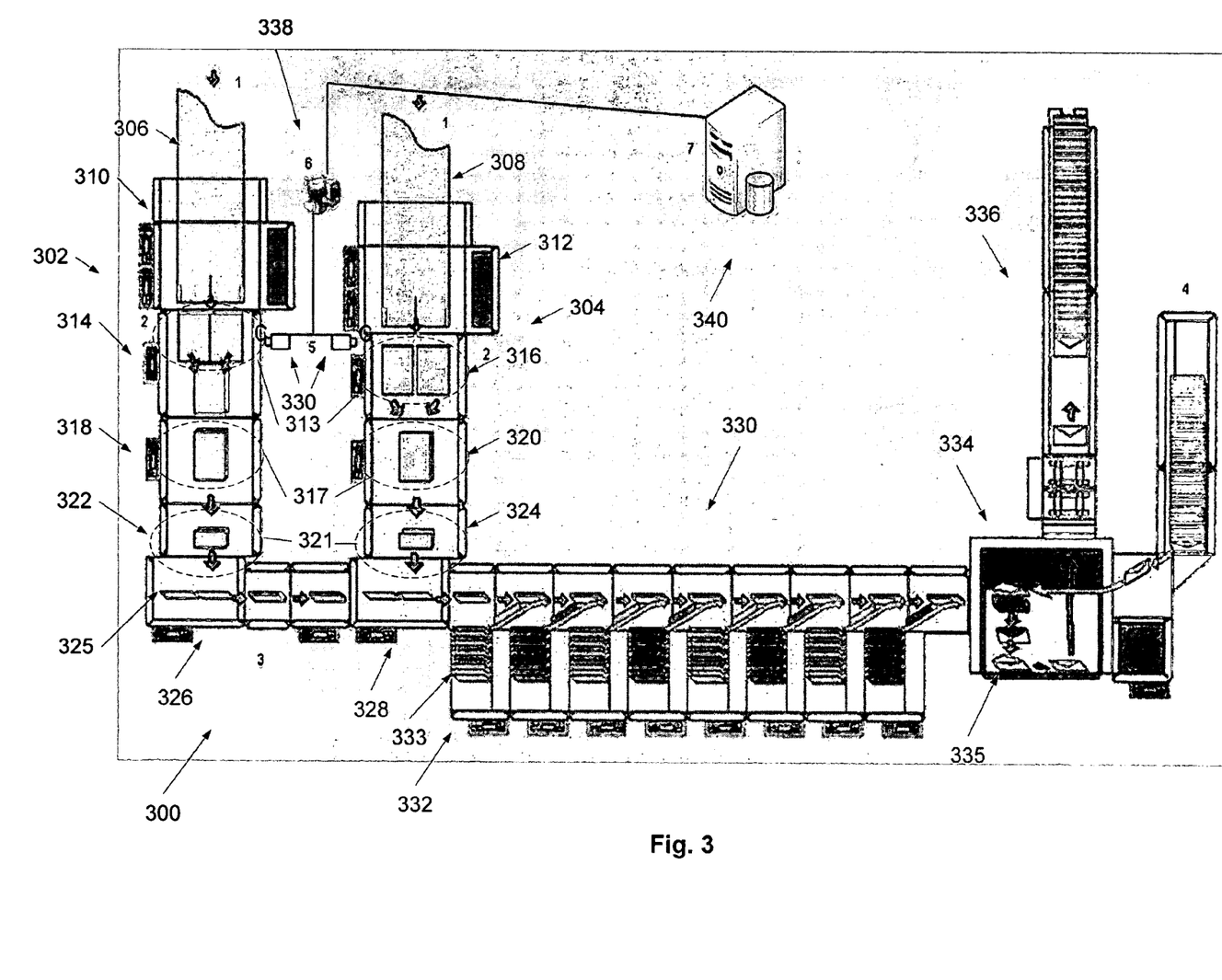
FIG. 3 depicts an exemplary document processing system in somewhat greater detail.

FIG. 3 depicts one example of a document processing machine 300 corresponding to the document processing system 100 of FIG. 1. For simplicity, only devices or modules downstream from printers 108, 110, 112 are illustrated. The machine 300 includes two print stream processing modules 302, 304 which generally correspond to the print stream processing modules 102, 104 of FIG. 1. However, the machine 300 can accommodate more than two print stream processing modules 302, 304. Each print stream processing module 302, 304 accommodates material that is a "2-up continuous forms input" 306, 308. In other words, two sheets are printed and conveyed in a contiguous and continuous side-by-side and successive relationship. However, each print stream processing module 302, 304 may accommodate 1-up continuous forms input or individual input. It is even possible that one print stream processing module 302 may accommodate one input type whereas the second print stream processing module 304 may accommodate a different input type. For example, module 302 may be a print roll input while module 304 maybe fan fold printed sheets. Other options can be substituted by those skilled in the art.

In this example, each 2-up continuous forms input 306, 308 is fed to a continuous forms cutter 310, 312, each of which cuts the 2-up continuous forms input 306, 308 horizontally and vertically forming individual sheets 313. The individual sheets 313 are conveyed in the side-by-side relationship to merge modules 314, 316, each of which merge side-by-side sheets 313 into a stack 317. Often documents include more than two sheets. In such a case, the assembly modules 318, 320 downstream from the merge module 314, 316, respectively, merge successive side-by-side sheets 313 forming a stack 317 of more than two sheets 313.

Downstream from the assembly module 318, 320, each stack 317 enters a folder module 322, 324, which is capable of folding the stack 317. In this example, the folder module 322, 324 is the last stage in print stream processing modules 302, 304, respectively. However, it is well within the level of one ordinary skill in the art to incorporate other stages in each print stream processing module 302, 304.

FIG. 3 depicts a document processing module 330, corresponding to the document processing module 120 illustrated by FIG. 1, positioned downstream from the print stream processing modules 302, 304. In this example, the document processing module 330 includes upright modules, 326, 328, each positioned to receive folded stacks 321 output from the respective print stream processing module 302, 304. The folded stacks 321 output from each print stream processing module 302, 304 are conveyed flat; the upright modules 326, 328 upright each folded stack 321, designated by number 325. The upright folded stacks 325 are conveyed consecutively to an enclosure feeder 332, which applies at least one enclosure 333 to an upright folded stack 325 as it is conveyed through the document processing module 330. The enclosures 333 may include advertising material, credit cards, or any type of material that could not be printed by printers 114, 116, 118.

Downstream from the document processing module 330 is a finishing module 334. In this example, the finishing module 334 may be an inserting module which inserts the documents output from the document processing module 330 into envelopes 335. The envelopes 335 are then output to an output conveyor 336, for later processing.

As depicted by FIG. 1, a computer system 124 controls the various devices of the document processing system 100. Similarly, as depicted by FIG. 3, the computer system comprises a computer 338 and a database server 340. The computer 338 is primarily responsible for monitoring and controlling the operation of the document processing machine 300, and accesses the database 340 for print and control information. However, these devices need not be separate; rather they could be combined into one computer, as discussed above.

In this example, the computer 338 represents one or more computers that control the operation of the print stream processing modules 302, 304 and printers, which are illustrated by FIG. 1 to be positioned upstream from the print stream processing modules 302, 304. The computer 338 is capable of controlling other components of the document processing machine 300, as is represented by FIG. 1. The computer 338 is in communication with detectors 330, which monitor material as it is processed by each print stream processing module 302, 304. Detector 330 may be a camera or barcode scanner used to detect various attributes of the material. For mere illustrative purposes, FIG. 3 depicts one detector for each print stream processing module 302, 304. However, the detector 330 can be a plurality of detectors positioned throughout the print stream processing modules 302, 304. For instance, a detector 330 may be positioned corresponding to each module 302, 304, discussed above, of the print stream processing modules 302, 304. The positioning and usage of detectors 330 is well within the level of one of ordinary skill in the art and shall not be limiting to novel concepts discussed herein.

The computer system 124 optimizes the print stream. In other words, it optimizes the manner in which the printers (not shown in FIG. 3) produce streams of continuous forms input 306, 308 for each print stream processing module 302, 304. It assures that while one print stream processing module 302 is accumulating a document having a high page count, the other print stream processing module 304 will continue to process documents having smaller page counts.

In order to optimize the operation of the document processing machine 300, the computer optimizes the print files before the documents are ever printed. As a result, the operation of the document processing machine 300 may be optimized.

Figure 4:
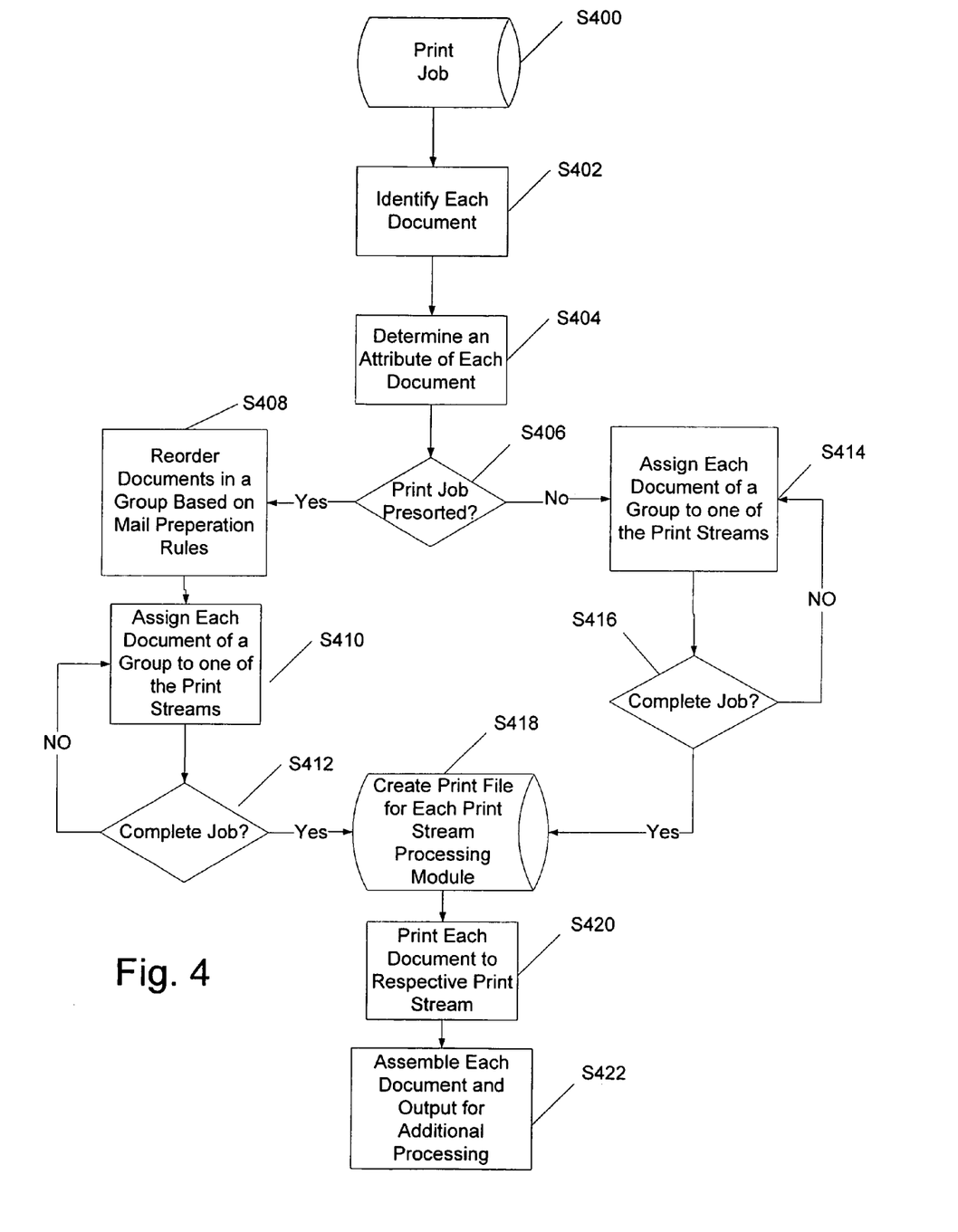
FIG. 4 is a flow chart depicting a technique by which the document processing machine throughput may be optimized.

FIG. 4 illustrates an exemplary flow chart showing the manner in which the operation may be optimized. By grouping documents and intelligently assigning each document to a particular print stream processing module, print stream processing modules 302, 304 (print stream processing modules 108, 110, 112 as shown by FIG. 1), and hence the document processing machine 300 (document processing system 110 as shown by FIG. 1) operate with maximum throughput.

In the figures depicting flow charts, the term "Step" is abbreviated by the letter "S." Also, as explained herein, each document to be printed has an attribute that relates to processing the respective document through the document processing systems, such as those illustrated by FIGS. 1 and 3. The attribute may include page count, type of material of the document, and destination information such as a recipient's zip code. Of course, these are not the only examples of attributes that may be considered to optimize the print streams for the print stream processing modules 302, 304. As will be explained further, documents having a high page count tend to stall the respective module when the document is being assembled. However, other document processing systems may stall based on other document attributes. It is well within the level of ordinary skill in the art to utilize other attributes relating to the processing of each document to optimize the print streams.

At Step 400, a print job is applied to a computer system 124. Alternatively, a remote computer system may be used to process a print job. Typically, a print job will include multiple documents to print, in fact often hundreds or thousands of documents to print, having different page counts. The computer system 124 analyzes the print job to identify each document (Step 402) and its page count (Step 404). Any type of software package known to those of ordinary skill in the art may be utilized to identify each document and its page count. Also, attributes other than the page count of each document may be determined in Step 404. For instance, utilizing the document processing machine 300 of FIG. 3, Postal Service discounts may be obtained if output mail is presorted. One way to ensure that the output mail is presorted is to group each document of a print job by common destinations, such as zip code. This avoids having to sort output mail. Hence, in Step 404, other attributes to determine may include recipient's zip code.

In Step 406, if the print job is not presorted, the computer system 124 will presort the print job by the at least one common attribute detected in Step 404, in this example by zip code. For a given print job, Table 1 lists each document identified in Step 402 and the at least one attribute determined in Step 404. The at least one attribute includes page count and zip code. Table 1 further illustrates an example of a print job that is not presorted, which is evident because the documents are not grouped by zip code. Conversely, Table 2 lists the print job (having the same contents as that listed by Table 1) that has been presorted. At Step 406, if the print job is not presorted, the documents may be ordered similar to that listed by Table 1. If the print job is presorted, the documents may be ordered similar to that listed by Table 2.

TABLE 1

Print Job

| Doc. | Pg. Cnt. | Zip Code |
|---|---|---|
| A | 4 | 22203 |
| B | 18 | 23233 |
| C | 4 | 20005 |
| D | 2 | 20005 |
| E | 9 | 23233 |
| F | 23 | 23233 |
| G | 54 | 22203 |
| H | 9 | 22203 |
| I | 2 | 20005 |

TABLE 2

Print Job Presorted

| Doc. | Pg. Cnt. | Zip Code |
|---|---|---|
| C | 4 | 20005 |
| D | 2 | 20005 |
| I | 2 | 20005 |
| A | 4 | 22203 |
| G | 54 | 22203 |
| H | 9 | 22203 |
| B | 18 | 23233 |
| E | 9 | 23233 |
| F | 23 | 23233 |

If in Step 406 it is determined that the print job is not presorted, the documents are grouped based on mail preparation rules (Step 408). Such rules are well known to those of ordinary skill in the art, and typically correspond to the at least one attribute determined in Step 404. If the at least one attribute corresponds to a zip code, the documents will be reordered similar to that as shown by Table 2 above. If in Step 406 it is determined that the print job is presorted, in this example, the documents already would be grouped similarly to the that shown by Table 2.

Steps 410 and 414 basically perform the same operation of assigning each document of a group to one of the print stream processing modules, such as those illustrated by FIGS. 1 and 3. Here, optimization and maximum throughput of a machine can be accomplished by intelligently assigning each document to a print stream processing module 302, 304. This operation will be discussed further below. The step of assigning the documents to one of the print stream processing modules is repeated for each group of documents until all documents in each group have been assigned to one of the print stream processing modules. (Step 412, Step 416). Once all documents have been assigned, a representation of each print stream is generated. For example, a print file may be created for each printer that generates a print stream for a print stream processing module 302, 304 (Step 418). In Step 420, each document is printed to a respective print stream in accordance with the respective representation or a print file generated in Step 418. In Step 422, each document is assembled and output for additional processing, as discussed above with respect to FIGS. 1 and 3.

As alluded to above, the step of intelligently assigning each document to one of the print stream processing modules enhances operation of the document processing machine 300. Specifically, grouping software controls how documents are printed and breaks a single print stream up into at least two streams, one for each print stream processing module 302, 304. Assuming two print streams, the document order in the two print streams can also be shuffled around while at least maintaining postal discounts so as to balance document sizes between the two print stream processing modules 302, 304 and increasing machine speed. In doing so, the goal is to have one print stream processing module 302, 304 continuously feeding several small documents while the other print stream processing module 302, 304 is accumulating one large document. This keeps the machine processing documents and eliminates "stalls" while processing high page count mail. After the mail is grouped by zip code (and possibly further by tray size), the documents can be sub-grouped for optimal throughput and split into two or more print streams. This will result in multiple rolls or stacks of paper, which are presented to the multiple print stream processing modules 302, 304 of the document processing machine at the same time. The running sequence number, which will be read as the pieces enter into the system, will allow the machine to put it back into the order it was before the split. The filled tray will be in the same order it would have been if the job had been done on a single print stream processing module system.

Figure 5:
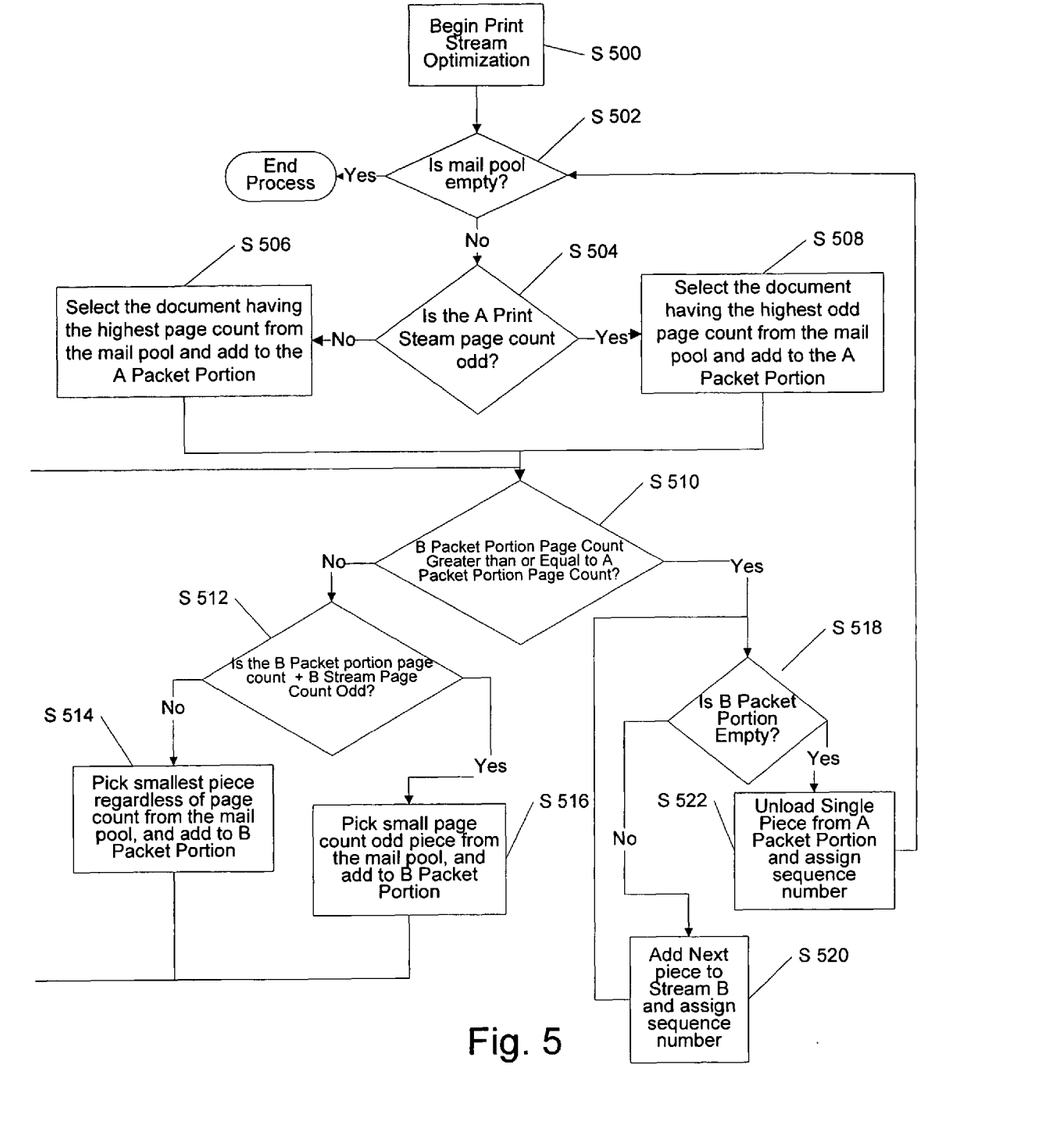
FIG. 5 is a flow chart depicting a flow chart by which to generate print files for the printers of the document processing machine.

FIG. 5 provides a flow chart of an exemplary manner to facilitate this enhancement. Essentially, the process represented by FIG. 5 corresponds the Step 410 or 414 of FIG. 4.

Documents are grouped based on a common attribute. Each group can be divided into a plurality of sub-groups or packets. Therefore, a packet of documents corresponds to one or more documents assigned to multiple print streams. A packet includes documents that are assigned to multiple print stream processing modules such that each print stream processing module processes its assigned documents concurrently with the other print stream, processing module(s). This results in a balanced operation time for each print stream processing module. In one exemplary embodiment, a packet may be divided evenly among multiple print stream modules such that the page count for each assigned portions are substantially equal.

The exemplary flow chart of FIG. 5 describes the optimization of two print streams, referred to as an "A" stream and a "B" stream. A "packet" corresponds to a sub-group of documents within a given group assigned to the A and B streams. Therefore, an A packet portion corresponds to the portion of the packet assigned to print stream A. A B packet portion corresponds to the portion of the packet assigned to print stream B.

In the exemplary embodiment described with respect to FIG. 5, a balanced operation time may be achieved by assigning documents, in packets, to the A stream and the B stream such that a print stream processing module processes the packets at substantially the same time. This is achieved by assigning a document within a packet having a large page count to one print stream and assigning a set of documents within the packet having smaller page counts to a different print stream. Therefore, the print stream processing module processing the document having the large page count will finish at substantially the same time as the print stream processing module processing the documents having the smaller page counts.

Moreover, the exemplary embodiment described herein processes each print stream in a 2-up format. In the preferred embodiment, 2-up format refers to the alignment of pages in the printed material. Pages within a document are aligned side-by-side, where the left hand page is fed into the accumulator first, followed by the right hand page. Such formatting and/or orienting of inputs—where odd page numbers are always on the left—increases throughput for documents with even number page counts. However, documents having odd page counts can slow processing, as the accumulator must hold back one page since it belongs to the next document. The worst case loss of throughput occurs when an even page count document follows an odd page count document such that page one of the even page count document falls on the right side of the input printed material. In this case, all subsequent even page documents will be forced to lose an accumulation cycle.

To address the above stated concerns, the exemplary embodiment of the invention, FIG. 5, reorders the documents such that a document having an odd page count is followed by another document having an odd page count. This prevents the miss alignment of even count page documents. Step 500 marks the beginning of the print steam optimization process in which documents are reordered. In Step 502, it is determined whether or not the mail pool is empty. The mail pool comprises the document group to be optimized and corresponds to the group in Steps 408 and 414 of FIG. 4. Once all of the documents for a given group have been optimized, the mail pool will be empty and the optimization for the given mail pool will end. Assuming that the documents have not been optimized, i.e. the mail pool is not empty, it is determined whether or not the A print stream page count is odd, i.e. if the sum of all pages for the documents in stream A is an odd number (Step 504). If the page count is not odd, a document having the highest page count is selected from the mail pool. This document is added to the A packet portion (Step 506). If the A print stream page count is odd, a document having the highest odd page count is selected from the mail pool. This document is added to the A packet portion (Step 508).

Following either Steps 506 or 508, the B packet portion page count is compared with the A packet portion page count to determine whether the B packet portion page count is greater than or equal to the A packet portion page count. If not, in Step 512 it is determined if the cumulative page count of the B packet portion and the B stream is odd. If the cumulative page count is not odd, in Step 514, the document having the smallest page count is selected. Since the cumulative page count is not odd, either an even number or odd number page count may be selected. The selected document is added to the B packet portion. On the other hand, if the cumulative page count is odd, in Step 516, the document having the smallest odd page count document is selected. The selected document is added to the B packet portion. Following either Steps 514 or 516, the process returns to Step 510.

If in Step 510, the B packet portion page count is greater than or equal to the A packet portion page count, the process advances to Step 518. In Step 518 it is determined if the B packet portion is empty. Typically, the first time this step is performed, the B packet portion will not be empty because a large document has been assigned to the A packet portion (Steps 506 or 508), however, a set of smaller documents have not been assigned to the B packet portion. In other words, assigning documents from the mail pool has not been completed. Therefore, if in Step 518, the B packet portion is not empty, Steps 518 and 520 repeat until the B packet portion is empty. As each document is assigned to the B print stream, a sequence number is assigned for tracking. Once the B packet portion is empty, a single document from the A packet portion is unloaded and assigned a sequence number. Following Step 522, the process returns to Step 502 and repeats.

At this time, a balanced operation has been accomplished for a given packet of documents. In other words, the print stream processing modules will complete processing of the given packet at substantially the same timing, with a few or no extra cycles from processing documents having odd page counts.

Figure 6:
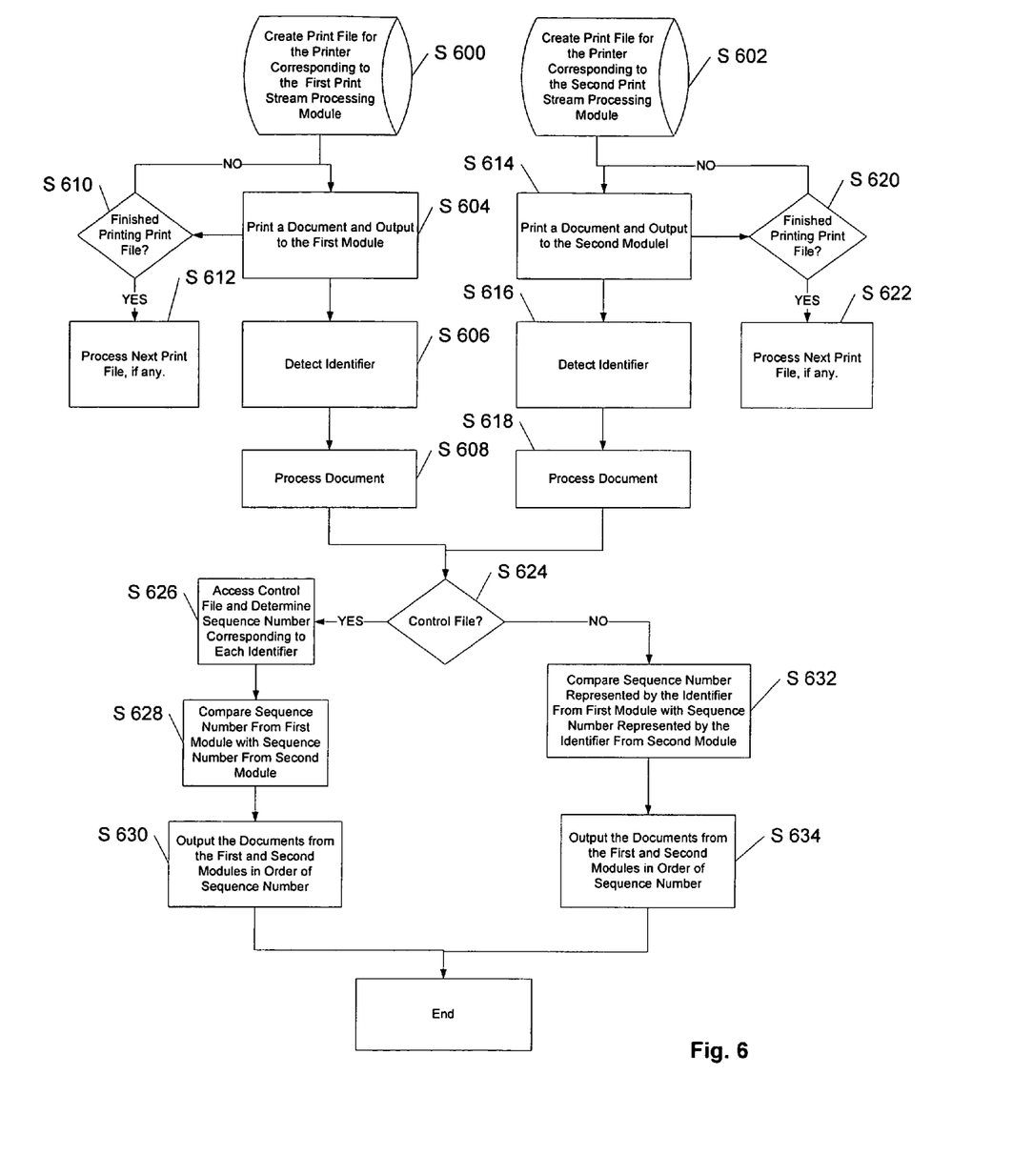
FIG. 6 depicts a flow chart of the processing and tracking of documents utilizing the document processing machine.

FIG. 6 depicts an exemplary flow chart of the manner in which the documents are processed and tracked utilizing the document processing machine 300 of FIG. 3. Steps 600 and 602 of FIG. 6 correspond to Step 418 in FIG. 4. However, in Step 600, a representation, e.g. a print file, is generated for the printer corresponding to the first print stream processing module 302; in Step 602, a representation, e.g. a print file, is generated for the printer corresponding to the second print stream processing module 304. Steps 604-612 are identical to Steps 614-622, respectively, except that the former correspond to the operation of the first print stream processing module 302 and the latter correspond to the second print stream processing module 304. The following description of Steps 604-612 apply to Steps 614-622, but for the different print stream processing module 302, 304.

In Step 604, the printer prints a document and outputs it to the first print stream processing module 302. Because the printers utilize continuous forms material, the printer continuously prints the documents specified by the representation of the print stream, e.g. a print file. As the continuous forms input 306 is applied to the first print stream processing module 302, the cutter module 310 separates or cuts the continuous forms input 306 into individual sheets. As explained above, when the print file is generated, a sequence number is assigned to each document (See FIG. 5). It is useful to print the sequence number on each document or each page of each document, as an identifier of the document being processed. Accordingly, the detector 330 (FIG. 3) may detect each document or document page. The identifier may be in the form of a barcode, alphanumeric character, glyph, symbol or any other manner in which to identify the document. The identifier is important to ensure that the documents output from the print stream processing modules 302, 304 are grouped to maximize postal discounts, and to ensure that the print stream processing modules 302, 304 process the documents with maximum throughput. The computer system 124 receives information from the detector 330 for each print stream processing module 302, 304 and can control the output of each print stream processing module 302, 304 such that the documents are output in order according to their sequence numbers. Steps 608 generally represent the step of processing each document, as explained above.

Often times, multiple print jobs may be executed consecutively. The system allows for a continuous operation from one print job to the next. Hence, following Step 604, the computer system determines whether the printers have finished printing a print job (Step 610). If so, the system will process the next print file, if one has been sent to the printer (Step 612). If not, the next document is printed (Step 604).

A control file may be used to track the documents as they are being processed. However, this is optional. Typically, a control file may be used if an identifier doesn't identify a sequence number. [Backwards—sequence number is proper, rather if you detect a credit card number, name, etc. etc. . . . Sequence number is unique identifier. Control file—attributes total pages within a package, additional flyer for device 333) The control file is accessed to determine the sequence number corresponding to each identifier (Step 626), and this is done for each print stream processing module 302, 304. In Step 628, the sequence number of the document being assembled is compared with the sequence number of the document concurrently being assembled in the other print stream processing module 302, 304. In Step 630, the document is output in order of its sequence number.

If a control file is not used, the sequence number may be read directly from the document or each page of the document and compared with the sequence number from the document processed concurrently. Incidentally, Steps 632-634 correspond to Steps 628-630, respectively.

Example

As explained above, after the mail is grouped, it is printed and presented to a document processing device, such as an inserter. The speed of the inserters is greatly influenced by the amount of pages per package. Typically, the speed of the cutter and assembling unit will define the overall speed of the system.

Table 3 provides the maximum speed each print stream processing module illustrated by FIG. 3 can process a document for various page counts utilizing BÖWE SYSTEC TURBO PLUS (18K) mail processing machine.

TABLE 3

| Pages | Max Speed | Calculated Thru-put (65%) |
|---|---|---|
| 1 | 18,000 | 11,700 |
| 2 | 14,100 | 9,165 |
| 3 | 10,800 | 7,020 |
| 4 | 8,300 | 5,395 |
| 5 | 6,800 | 4,420 |

As explained above, the computer system has the ability to break a single print stream up into two or more. For instance, it may split the stream after the mail is grouped by zip code and optimized for tray size split it up into two print streams. This will result in two rolls or stacks of paper, which are presented to the two print stream processing modules 302, 304 of the inserter at the same time. The running sequence number, which will be read as the pieces enter into the system, will allow it to be put back into the order it was before the split. Thus, the filled tray will be in the same order it would have been in if it had run on a single print stream processing module system.

Figure 7:
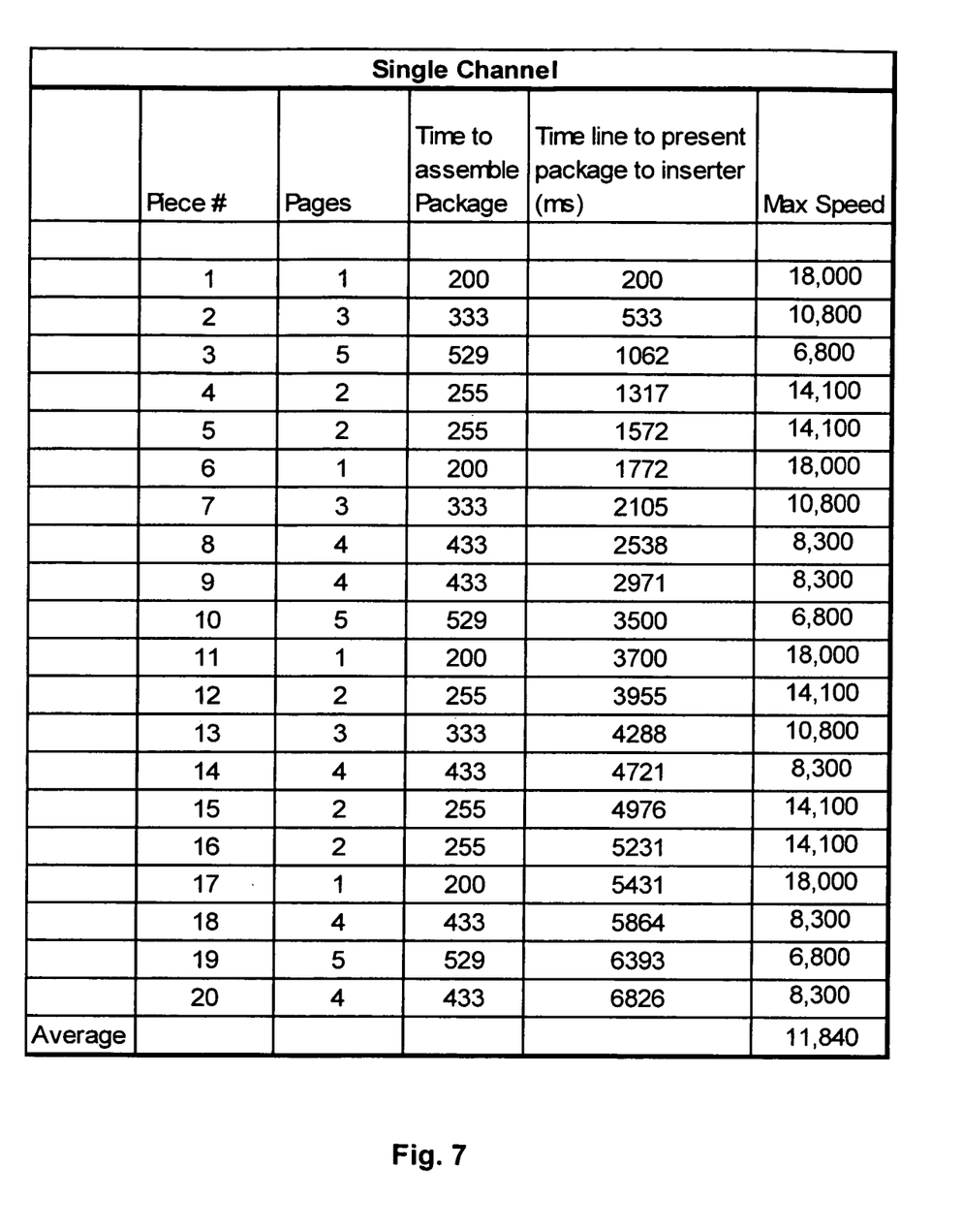
FIG. 7 depicts a table of the time it takes to assemble each document having various page counts utilizing a document processing machine having one print stream processing module.
Figure 8:
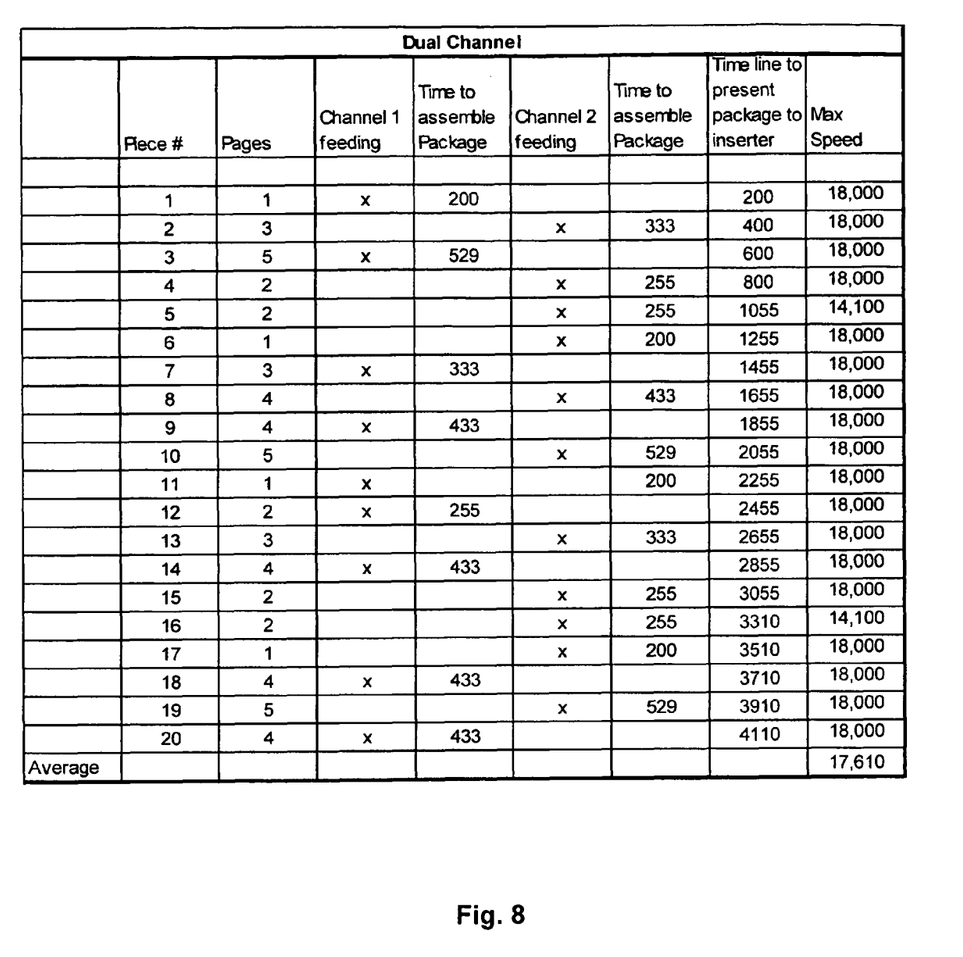
FIG. 8 depicts a table of the time it takes to assemble each document having various page counts utilizing a document processing machine having two print stream processing modules.

The tables illustrated by FIGS. 7 and 8 provide an example how this method would impact the speed on an inserter. The example is based on an inserting system with a maximum speed of 18,000 envelopes per hour. Therefore, a package has to be ready for the inserter every 200 ms.

As explained above, the two print stream processing modules 302, 304 complement each other to ensure maximum speed of the inserter. FIG. 7 illustrates a table of the time it takes to assembly each document ("Piece #") having various page counts utilizing one print stream processing module. FIG. 8 illustrates a table of the time it takes to assemble each document utilizing two print stream processing modules 302, 304. Test results indicate that 6.8 seconds were required to insert 20 packages without implementing the novel concepts, as opposed to only 4.1 seconds practicing the novel concepts discussed herein. This is an increase in speed by approximately 60%.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for optimizing multiple print streams for post printing processes including an insertion process, the print streams destined for at least a first print stream processing module, for processing printed documents printed by a printer, attached to a first input port of a post processing module including an inserter and a second print stream processing module, for processing printed documents printed by the printer, attached to a second input port of said post processing module including the inserter the method comprising steps of:
   (a) receiving an input representing job for a plurality of documents to be printed by the printer, each of the documents including one or more pages;
   (b) determining a first attribute of each document of the plurality of documents;
   (c) balancing an operation time of the first print stream processing module to process the printed documents with an operation time of the second print stream processing module to process the printed documents, so as to maximize a number of documents processed by the inserter per time period by assigning, based on the determined first attribute, each document to one of a first print stream associated with the first print stream processing module and a second print stream associated with the second print stream processing module; and (d) generating a revised job of the first print stream for the first print stream processing module and the second print stream for the second print stream processing module, wherein:

before the assigning each document to be processed to one of the first print stream and the second print stream, the plurality of document documents are presorted into groups, in accordance with a second attribute so that the documents having a same sort of the second attribute are presorted into a same presorted group, the step (c) is performed, with respect to each presorted group, such that, within the same presorted group, the documents are assigned to one of the first print stream and the second print stream based on the first attribute so as to balance the operation times while maintaining the presorted group based on the second attribute, the first attribute of each document set represents a number of pages in each document, and the second attribute relates to delivery destination of inserted documents.

2. The method for optimizing multiple print streams according to claim 1, wherein the delivery destination relating to the second attribute relates to an address that each of the inserted documents is to be delivered.

3. The method for optimizing multiple print streams according to claim 1, wherein the method further comprises the steps of:
(i) assigning the documents in a decreasing order of the number of pages to the first print stream; and
(ii) assigning the documents in an increasing order of the number of pages to the second print stream.

4. The method for optimizing multiple print streams printing according to claim 1, further comprising assigning an even number of documents having an odd number of pages to the first print stream processing module and the second print stream processing module.

5. The method for optimizing multiple print streams according to claim 1, further comprising the steps of:
(i) receiving information corresponding to detecting an identifier on each document output from the first print stream processing module and the second print stream processing module; and
(ii) controlling the output of each document from the first print stream processing module and the second print stream processing module to be in the presorted group as in the input job for the plurality of documents to be printed.

6. The method for optimizing multiple print streams according to claim 5, further comprising the steps of:
(iii) accessing control information;
(iv) matching the information corresponding to detecting an identifier on each document with associated information in the control information accessed; and
(vi) processing each document set based on the associated information.

7. The method for optimizing multiple print streams according to claim 5, wherein the identifier is of a type selected from a group consisting of: a barcode, text, data matrix, glyph, symbol, insignia, mark, logo, and watermark.

8. A program product comprising:
executable instructions for causing a programmable device to perform the method of claim 1; and
a machine readable non-transitory non-volatile medium bearing the instructions.

9. The method for optimizing multiple print streams according to claim 1, wherein the first and second print stream processing modules further includes at least one of a cutter, a merge module, or a folder module.

10. A method for optimizing multiple print streams for post printing processes, the print streams destined for at least a first print stream processing module for processing printed documents and a second print stream processing module for processing printed documents of a document processing system, the method comprising steps of:

(a) receiving an input representing a plurality of documents to be printed;
(b) determining an attribute of each document of the plurality of documents represented by the input, the attribute relating to processing the respective document through the document processing system;
(c) balancing an operation time of the first print stream processing module with an operation time of the second print stream processing module by assigning each document to one of a first print stream associated with the first print stream processing module and a second print stream associated with the second print stream processing module based on the determined attribute; and
(d) generating representations of the first print stream for the first print stream processing module and the second print stream for the second print stream processing module, wherein the at least one attribute of each document represents its page count, and the method further comprises the steps of:

determining if a total page count of the documents assigned to each of the first print stream processing module and the second print stream processing module is odd; and
(ii) if the total page count of the documents assigned to the respective print stream processing module is odd, assigning a document having an odd page count to be the next document to the print stream representation of its respective print stream processing module.

11. The method for optimizing multiple print streams according to claim 10, wherein the document having the odd page count has the smallest odd page count of the plurality of documents to be printed.

12. A multi-print stream processing module system for optimizing multiple print streams, comprising:
at least one printer for outputting a first print stream and a second print stream of printed documents;
a first print stream processing module for processing the printed documents, the first print stream processing module being coupled to the at least one printer and attached to a first input of a post processing module including an inserter; and
a second print stream processing module for processing the printed documents, the second print stream processing module being coupled to the at least one printer and attached to a second input of the post processing module including the inserter;
a computer for generating a first print file and a second print file for the at least one printer based on an input job received for a plurality of documents to be printed, each of the documents including one or more pages, wherein:

the computer determines a first attribute of each document of the plurality of documents of the input job, the first attribute including a number of pages of each document;

balances an operation time of the first print stream processing module with an operation time of the second print stream processing module to maximize a number of documents processed by the inserter per time period by assigning, based on the determined first attribute, each document to one of the first print stream and the second print stream for driving the at least one of the first and second print stream processing modules based on the first print stream and the second print stream; and presorts the documents in the input job into groups, before being assigned to first print stream or the second print stream, in accordance with a delivery destination attribute relating to delivery destination of inserted documents so that the documents having a same sort of the delivery destination attribute are presorted into a same presorted group, and the assigning each document is performed, with respect to each presorted group, such that, within the same presorted group, documents are assigned to one of the first and second print streams to balance the operation times while maintaining the presorted group based on the delivery destination attribute.

13. The multi-print stream processing module system for optimizing multiple print streams according to claim 12, wherein the post processing module includes one or more assembly devices for processing the documents output from the first print stream and the second print stream.

14. A method for optimizing one or more print streams for post printing processes, wherein at least one attribute of each of one or more documents represents number of pages, the method further comprising steps of:
(i) assigning documents to print streams;
(ii) determining a number of pages of each of the documents; and
(iii) assigning to print stream processing modules, for processing printed documents, attached to an input of a post processing module including an inserter, an additional document which makes the cumulative number of pages for the print streams even, wherein:

the assigning to the print stream processing modules the additional document is performed for driving at least one of the print stream processing modules to process the printed documents based on assignments of the print stream processing modules, the documents are presorted into groups, before being assigned to the print stream processing modules, in accordance with a delivery destination attribute relating to a delivery destination of documents to be printed so that the documents having a same sort of the delivery destination attribute are presorted into a same presorted groups, the assigning is performed, with respect to each presorted group, such that the additional document is assigned to one of the print stream processing modules while maintaining the same presorted group based on the delivery destination attribute.

* * * * *